United States Patent
Proctor et al.

(10) Patent No.: US 11,210,452 B2
(45) Date of Patent: *Dec. 28, 2021

(54) HIGH PERFORMANCE PHP

(71) Applicant: Facebook, Inc., Menlo Park, CA (US)

(72) Inventors: Iain Andrew Russell Proctor, San Francisco, CA (US); Minghui Yang, Fremont, CA (US); Haiping Zhao, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 300 days.

This patent is subject to a terminal disclaimer.

(21) Appl. No.: 15/690,199

(22) Filed: Aug. 29, 2017

(65) Prior Publication Data

US 2018/0004489 A1   Jan. 4, 2018

Related U.S. Application Data

(63) Continuation of application No. 14/202,809, filed on Mar. 10, 2014, now Pat. No. 9,753,697, which is a
(Continued)

(51) Int. Cl.
*G06F 40/143* (2020.01)
*G06F 8/51* (2018.01)
*G06F 8/30* (2018.01)

(52) U.S. Cl.
CPC .............. *G06F 40/143* (2020.01); *G06F 8/31* (2013.01); *G06F 8/51* (2013.01)

(58) Field of Classification Search
CPC . G06F 17/22; G06F 8/31; G06F 40/14; G06F 8/51; G06F 40/143
(Continued)

(56) References Cited

U.S. PATENT DOCUMENTS 6,041,180 A * 3/2000 Perks .................... G06F 8/4434
717/151
6,149,318 A * 11/2000 Chase .................... G06F 8/437
714/E11.209
(Continued)

OTHER PUBLICATIONS

United States Advisory Action, U.S. Appl. No. 12/891,554, dated Jun. 14, 2013, three pages.
(Continued)

*Primary Examiner* — Kavita Stanley
*Assistant Examiner* — Tionna M Burke
(74) *Attorney, Agent, or Firm* — Fenwick & West LLP

(57) ABSTRACT

Markup language documents including server side scripting code using PHP syntax are executed efficiently in response to requests received by a server. The processing of the markup language document results in generation of a transformed markup language document that is returned in response to the request. The server side script code is input to a compiler that generates C++ code (or code in any object-based language based on C language) implementing the functionality of the server side script code. The C++ code is compiled to generated object code which is executed in order to process the markup language document. The generated C++ code includes functionality supported by PHP language including redeclaration of functions, dynamic variables, global variables, and the like. The generated C++ code invokes memory allocation code that allocates and deallocates objects obtained by instantiating the generated C++ classes.

18 Claims, 11 Drawing Sheets

Related U.S. Application Data continuation of application No. 12/891,554, filed on Sep. 27, 2010, now Pat. No. 8,707,161.

(60) Provisional application No. 61/247,494, filed on Sep. 30, 2009.

(58) Field of Classification Search
USPC .......................................................... 715/234
See application file for complete search history.

(56) References Cited

U.S. PATENT DOCUMENTS

| | | | |
|---|---|---|---|
| 6,154,823 A | 11/2000 | Benayon et al. | |
| 6,990,653 B1 * | 1/2006 | Burd ..................... | G06F 16/972 |
| | | | 717/108 |
| 7,467,157 B1 * | 12/2008 | Chen ................... | G06F 11/3684 |
| 7,873,706 B2 * | 1/2011 | Thoen ............ | H04N 21/234309 |
| | | | 370/219 |
| 2005/0015673 A1 * | 1/2005 | Plesko ...................... | G06F 8/20 |
| | | | 714/38.14 |
| 2008/0178149 A1 * | 7/2008 | Peterson ................ | G06F 8/437 |
| | | | 717/110 |

OTHER PUBLICATIONS

United States Office Action, U.S. Appl. No. 12/891,554, dated Mar. 1, 2013, fifteen pages.
United States Office Action, U.S. Appl. No. 12/891,554, dated Jun. 15, 2012, twelve pages.
United States Office Action, U.S. Appl. No. 14/202,809, dated Aug. 19, 2016, sixteen pages.

* cited by examiner

λ(l-type1, l-type2,..., r-type1, r-type2,...)

λ can be:
•function calls:    $a = strtolower($b);    ——710
    string strtolower(String)
    $a's l-type is String
    $b's r-type is String
•operators:    $a = $b + $c;    ——720
    Numeric operator+(Numeric, Numeric)
    $a's l-type is Numeric
    $b's r-type is Numeric
•expressions/statements:    foreach ($a as $b) {}    ——730
    foreach(Array as Variant)
    $a's r-type is Array
    $b's l-type is Variant

FIG. 7

HIGH PERFORMANCE PHP

CROSS REFERENCES TO RELATED APPLICATIONS

This application is a continuation of U.S. patent application Ser. No. 14/202,809, filed on Mar. 10, 2014, which is a continuation of U.S. patent application Ser. No. 12/891,554, filed on Sep. 27, 2010, now issued as U.S. Pat. No. 8,707,161, which claims the benefit of U.S. Provisional Application No. 61/247,494, filed Sep. 30, 2009, each of which is incorporated by reference in its entirety.

BACKGROUND

This invention relates to efficient execution of server side script code that generates dynamic web pages.

Server side scripting technology executes a user request received at a web server by dynamically generating web pages. Server side scripting allows easy implementation of interactive websites that interface with data stores for retrieving and storing information. Earlier server side scripting technology executed using Perl scripts or shell scripts and C programs using the Common Gateway Interface (CGI). The CGI technology used the operating system support for executing scripts. Recent technology based on PHP (Personal Home Page) scripting language allows embedding of script code with hypertext markup language (HTML). PHP scripts can be executed by the web server or extension modules of the web server. The direct execution by the web server improves performance compared to execution of the scripts by the operating system.

PHP scripts are easy to write since they are based on a small set of expressions and statements and are simple to learn. PHP allows the script to use untyped variables thereby providing ease of programming. However, PHP programs can cause high CPU consumption as well as high memory consumption. The process model of PHP programs is not scalable to large scale installations serving millions of clients, since a very large number of processes may be executed while executing a PHP script. Furthermore execution of PHP scripts is slow since the code is executed using a byte-code interpreter. The conventional PHP code uses weak typing, for example, a developer can use an array comprising elements of various types including integers, strings or arrays. Execution of a weakly typed code can be inefficient resulting in slow overall performance. Other slow operations used in PHP include dynamic symbol lookups for functions, variables, class methods, and constants. All these operations make a PHP program execution inefficient and slow.

SUMMARY

Embodiments of the invention provide for efficient execution of server side script code using PHP syntax. A markup language document comprising server side scripting is retrieved. The server side scripting code uses the syntax of PHP language. A compiler generates C++ code based on the server side scripting code of the markup language document. The generated C++ code comprises one or more C++ classes, one or more C++ header files storing information describing structures of the C++ classes, and code for memory allocation of objects instantiated from the C++ classes. The generated C++ code is compiled into object code. The object code is invoked in order to process the markup language document.

The object code is sent to a production system that receives requests identifying the markup language document. In response to the request identifying the markup language document, the server side scripting code of the markup language document is processed. The processing of the markup language document results in generation of a transformed markup language document which is returned to the requestor.

The generated C++ code implements various functionality provided by a PHP language. Server side script functions are implemented as C++ functions which are invoked using a function invoke table that stores pointers to the functions. Redeclaration of functions in PHP is implemented using a structure with a pointer to a C++ function selected from a plurality of C++ functions, each function corresponding to a redeclaration of the PHP function. The generated code invokes memory allocation code. In an embodiment, the memory allocation code allocates a set of multiple objects of the same size. Alternatively, variable sized objects are allocated and stored in a persistent store for subsequent use in initializing global state of the C++ code in execution.

BRIEF DESCRIPTION OF THE DRAWINGS

FIG. 7 illustrates type inferencing in HPHP using examples of abstractions including function calls, operators and expressions/statements, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
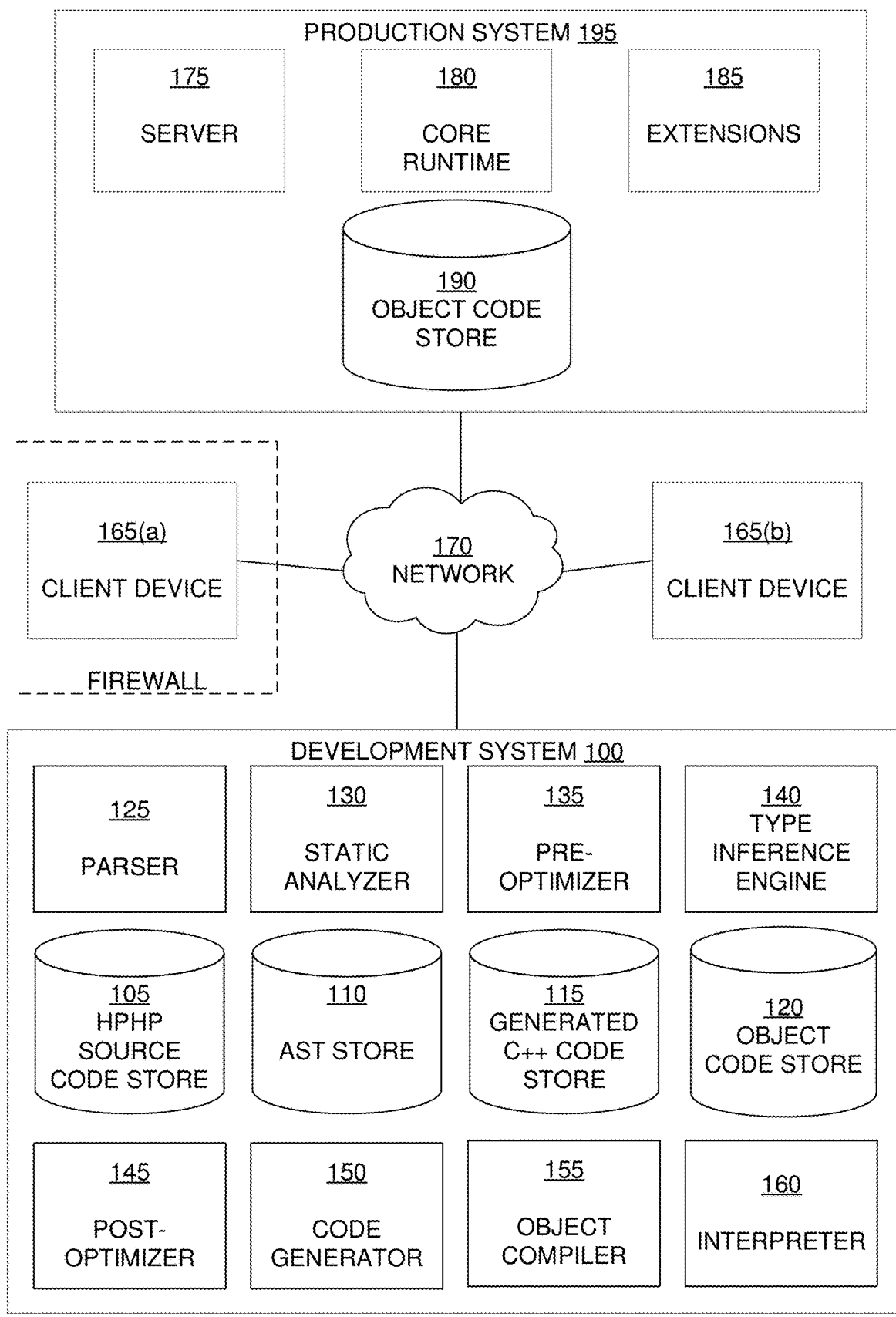
FIG. 1 is a system architecture diagram illustrating client devices interacting via a network with a development system and a production system for high performance PHP programs, in accordance with an embodiment of the invention.

FIG. 1 shows a system architecture diagram illustrating client devices 165 interacting via a network 170 with a development system 100 and/or a production system 195 for high performance PHP ("HPHP") programs, in accordance with an embodiment of the invention. A HPHP program comprises server side script code that is compliant with the PHP syntax and semantics. The HPHP code is executed by invoking object files generated from C++ code which in turn is generated from the HPHP code. Other embodiments can transform HPHP code into other object-oriented or object-based languages based on C that are compiled into object code, for example objective C. In an embodiment, HPHP code written using PHP syntax can be compiled into a C program with appropriate data structures corresponding to the objects that can be defined using C++. In contrast, the PHP code is conventionally executed using an interpreter and is therefore slow in performance.

In this description, the term "module" or "component" refers to computational logic for providing the specified functionality. The named modules described herein represent one embodiment of the present invention, and other embodiments may include other modules. In addition, other embodiments may lack modules described herein and/or distribute the described functionality among the modules in a different manner. The modules are stored on a computer readable storage medium (e.g., hard disk), loaded into the memory (also a computer readable storage medium), and executed by one or more processors included as part of the development system 100 or the production system 195.

The development system 100 is used by developers of HPHP programs to implement HPHP programs. The HPHP programs are used to generate executable files that can be deployed in a production system 195. The production system 195 provides the core functionality that is made available to end users. Client devices 165 can access the development system 100 or the production system 195 using the network 170. (A letter after a reference numeral, such as "165(a)," indicates that the text refers specifically to the element having that particular reference numeral, while a reference numeral in the text without a following letter, such as "165," refers to any or all of the elements in the figures bearing that reference numeral.) The accessibility of the development system 100 or the production system 195 depends on whether the client device is outside or inside a firewall (and other network security mechanisms) of an enterprise implementing and deploying servers using HPHP programs.

A client device 165(b) inside the firewall is allowed to access the development system 100 as well as the production system 195. For example, software developers may access the development system 100 for implementing systems based on HPHP programs whereas service professionals or maintenance engineers may access the production system 195 that deploys systems based on HPHP. On the other hand, client device 165(a) outside the firewall of the enterprise hosting the development system 100 and production system 195 has access to production system 195 but cannot access the development system 100. Client device 165(a) is used by the end users of systems based on HPHP deployed on the production system 195.

The client devices 165 comprise one or more computing devices that can receive user input and can transmit and receive data via the network 170. In one embodiment, the client device 165 is a conventional computer system executing, for example, a Microsoft Windows-compatible operating system (OS), Apple OS X, and/or a Linux distribution. In another embodiment, the client device 165 can be a device having computer functionality, such as a personal digital assistant (PDA), mobile telephone, video game system, etc. The client device 165 is configured to communicate via network 170. The client device 165 can execute an application, for example, a browser application that allows a user of the client device 165 to interact with the production system 195 or the development system 100. The interactions of the user via the browser application running on the client device 165 include sending a request for information that identifies a markup language document comprising server side scripting code. The markup language document is processed to obtain a transformed markup language document that is returned in response to the request.

The network 170 uses standard communications technologies and/or protocols. Thus, the network 170 can include links using technologies such as Ethernet, 802.11, worldwide interoperability for microwave access (WiMAX), 3G, digital subscriber line (DSL), etc. Similarly, the networking protocols used on the network 170 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 170 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), Internet Protocol security (IPsec), etc.

The development system 100 includes parser 125, static analyzer 130, pre-optimizer 135, type inference engine 140, post-optimizer 145, code generator 150, object compiler 155, interpreter 160, HPHP source code store 105, AST store 110, generated C++ code store 115, and object code store 120. In alternative configurations, different and/or additional modules can be included in the development system 100. The input of each module is read from one of the stores, for example, HPHP source code store 105, AST store 110, generated C++ code store 115, and object code store 120 and the output of each module may be either stored in one of the above stores or directly provided as input to another module that performs further processing.

The HPHP source code store 105 stores source code of HPHP programs. The source code may be input by a software developer using an editor or copied from another computer. In an embodiment, the source code of HPHP is in a human readable text form. The parser 125 reads the source code of HPHP from one or more files in the HPHP source code store 105 and builds a data structure called an abstract syntax tree (AST) that is stored in the AST store 110. The AST is a hierarchical tree representation of an HPHP source code program. The parser 125 checks an input HPHP program for syntax errors and reports the errors in order to allow a user to correct the errors.

The static analyzer 130 reads the AST representation of an HPHP program from the AST store 110 and annotates the AST with additional information to generate an annotated AST. In an embodiment, the annotated AST is stored in the AST store 110. Alternatively, annotated AST representation is directly provided to the pre-optimizer 135 for further processing.

The pre-optimizer 135 performs transformations on the annotated AST generated by the static analyzer 130 to output a transformed AST that generates more efficient C++ code compared to the code generated by the input AST. The transformed AST is stored in the AST store 110.

The type inference engine 140 analyzes the nodes of the transformed AST to annotate the nodes with type information of the variables. The variables of HPHP source code may be untyped, which is one of the aspects of the PHP language. The inferred type information is added to the AST and stored in the AST store 110.

The post optimizer 145 performs further transformations on the AST based on the type information provided by the type inference engine 140. The modified AST is stored by the post optimizer 145 in the AST store 110.

The code generator 150 reads the AST output by the post optimizer 145 and generates C++ code there from. The generated C++ code is stored in the generated C++ code store 115.

The object compiler 155 reads the generated code from the generated C++ code store 115 and generates object code that is stored in the object code store 120. The object code generated from an HPHP source code program can be executed to obtain the functionality defined in the HPHP source code program.

The interpreter 160 allows software developers to run prototype HPHP source code for evaluation and testing purposes. The interpreter parses the input HPHP source code program and evaluates the AST on the fly. In an embodiment, a user interacts with the development system 100 using an integrated development environment that provides a user interface with commands for executing operations that translate into actions associated with the modules of development system 100.

The object code corresponding to an HPHP source code program can be moved from a development system 100 to a production system 195 for deployment. The production system 195 includes a server 175, core runtime 180, extensions 185 and the object code store 190. In alternative configurations, different and/or additional modules can be included in the production system 195. The object code generated by a development system 100 is stored in the object code store 190 of the production system 195.

The core runtime 180 defines an implementation of various classes that may be called by the object code stored in the object code store 190. The core runtime implements the essential functionality required by the object code. Certain advanced functionality is implemented as extensions 185. The functionality provided by core runtime and the extensions 185 is implemented using C++. The object code can be executed using the core runtime 180 and extensions 185 using a command line interface. The server 175 allows the object code stored in the object code store 190 to be executed in response to hypertext transfer protocol (HTTP) requests from a client device 165. The server 175 allows the object code stored in object code store 190 to be executed as a server rather than a command line program.

It should also be appreciated that in practice at least some of the components of the development system 100 or the production system 195 may be distributed over multiple computers, communicating over a network. For convenience of explanation, however, the components of the development system 100 or the production system 195 are discussed as though they were implemented on a single computer. In another embodiment, the HPHP source code store 105, AST store 110, generated C++ code store 115, or the object code store 120 may be located on a separate system that is coupled to the development system 100 by a network. Similarly, in an embodiment, the object code store 190 may be located on a separate system that is coupled to the production system 195 by a network. The development system 100 and the production system 195 also include one or more input/output devices that allow data to be input and output to and from the system. It will be understood that embodiments of the development system 100 and the production system 195 also include standard software and hardware components such as operating systems and the like and further include standard hardware components (e.g., network interfaces, storage devices, etc.) not shown in the figure for clarity of example.

Figure 2:
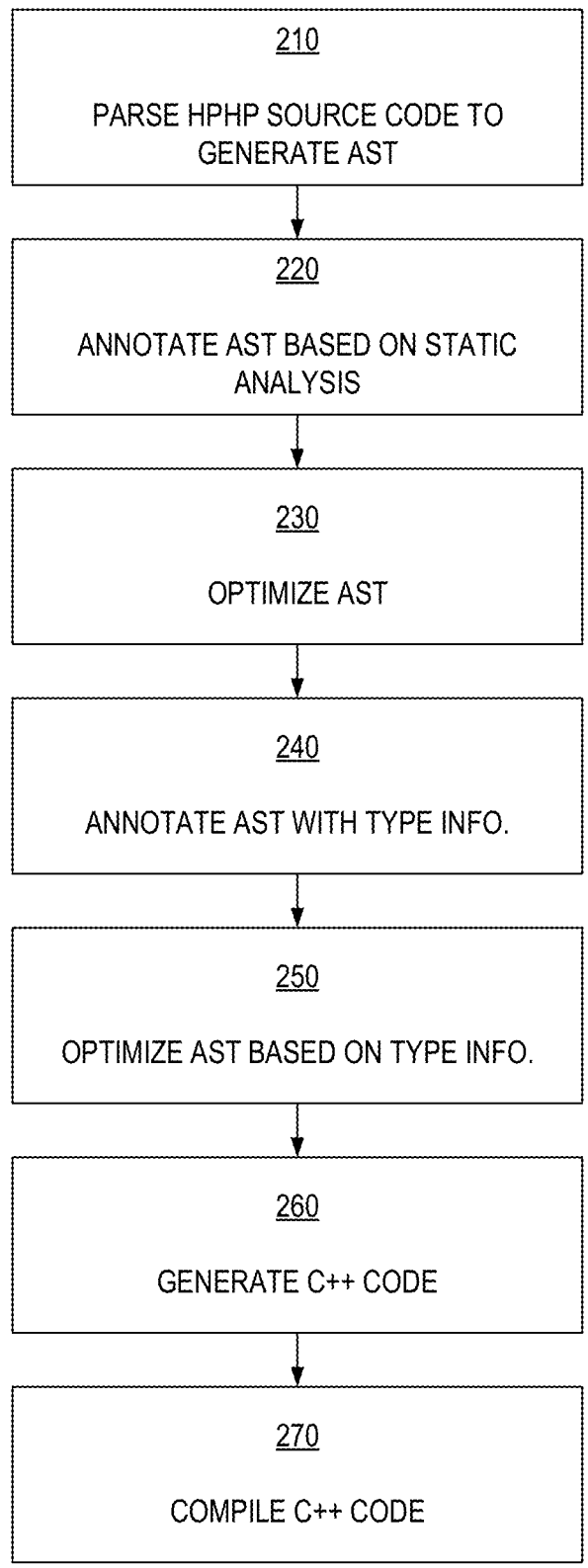
FIG. 2 is a flowchart of a process for compiling high performance PHP programs into object code, in accordance with an embodiment of the invention.

FIG. 2 is a flowchart of a process for compiling high performance PHP programs into object code, in accordance with an embodiment of the invention. The parser 125 parses 210 HPHP source code stored in HPHP source code store 105 to generate AST representation that is stored in the AST store 110. The static analyzer 130 performs static analysis of the AST generated by the parser 125 and annotates 220 the AST to generate an annotated AST. The annotated AST is optimized 230 by the pre-optimizer 135 by transforming the AST into a modified AST that results is efficient generated C++ code.

The type inference engine 140 annotates 240 the modified AST generated by the pre-optimizer 135 with type information for untyped variables, functions, and methods. The type inference engine 140 passes the AST to the post-optimizer phase. The post-optimizer 145 further optimizes 250 the AST output by the type inference engine 140 based on the type information added to the AST by the type inference engine 140.

The code generator 150 generates 260 C++ code from the optimized AST generated by the post-optimizer 145 and stores the generated C++ code in the generated C++ code store 115.

The object compiler compiles 270 the C++ code generated by the code generator 150 to generate object code and stores the generated object code in the object code store 120.

Memory Model

Figure 8:
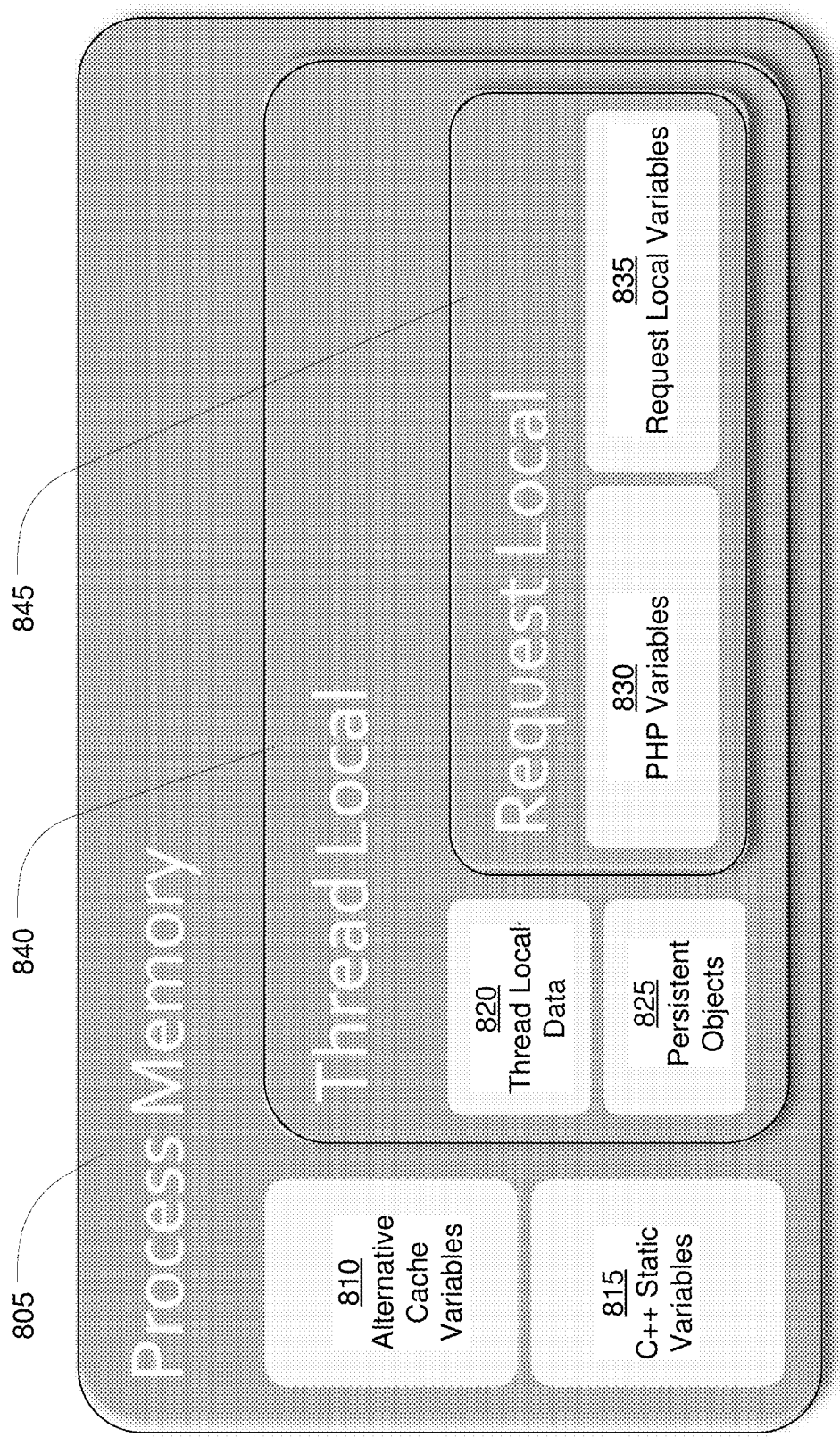
FIG. 8 illustrates memory allocation pools for different types of HPHP variables, in accordance with an embodiment of the invention.

The HPHP compiler allows different types of variables based on how the lifetime or scope of the variable is determined and how the memory corresponding to the variable is allocated or deallocated. FIG. 8 illustrates the different types of variables and their associated memory pools.

The process memory 805 is used to allocate memory for variables that can be accessed by multiple threads within a process or by multiple processes. These variables include alternative cache variables 810 and C++ static variables 815. The HPHP runtime can be configured to run as a single process with multiple threads. In this configuration, the alternative cache variables are the variables that are shared by all threads. The alternative cache variables may be accessed using functions that perform name-value lookups. The alternative cache variables are allocated and deallocated using malloc/free calls and reside in the process' memory. Granularity locking is implemented to ensure access form multiple threads are safe and efficient.

The HPHP runtime can be also configured to run as multiple processes that are forked. Multiple processes can share alternative cache variables that are allocated in shared memory regions that multiple processes can be attached to and share. In an embodiment, the boost: interprocess classes are used for allocating/de-allocating shared memory variables. Granularity locking is implemented to ensure safe reads and writes of these variables. The C++ static variables 815 are allocated in the process memory 805 and are accessible from multiple threads. Locking of the C++ static variables is implemented for thread safety.

Certain types of variables are allocated in a thread local memory space 840 that is accessible within a thread. In one embodiment, HPHP compiler implements ThreadLocal<T> template class that wraps any C++ data structures to make them thread local. A ThreadLocal<T> object is only intended to be accessed by a single thread, thus avoiding mutex locking. Other types of variables allocated in thread local memory space includes variables representing persistent objects 835. Persistent objects can be persisted across multiple requests, and are useful to represent for resource data. Persistent objects are allocated in thread local memory space. Hence, each thread has its own persistent object storage. Variables representing persistent objects are accessed by names. There is only one persistent object per name per thread. No locking is used for the persistent objects since they are internal to a thread and are not accessed by multiple threads or processes.

Some types of variables are implemented in request local memory space 845 and have a lifetime of a request processed by the HPHP runtime. A request local variable is also thread local. In addition, request local variables have initialization and shutdown processes at beginning and end of each HTTP request.

All variables from user HPHP code are request local variables. These variables go out of scope when the corresponding request is finished, even if the variable was a global variable. These variables can be primitive types, String, Array, Object or Variant. They are allocated and deallocated through smart allocators and linear allocators. No locking is used for these variables since they are internal to a thread and are not accessed by multiple threads or processes.

HPHP compiler also provides a RequestLocal<T> template class to allow PHP extensions to properly initialize and cleanup certain request local variables. The template class implements requestInit( ) and requestShutdown( ) virtual functions that are called by the HPHP execution engine at startup and shutdown time of an HTTP request.

Memory Allocators

Figure 9:
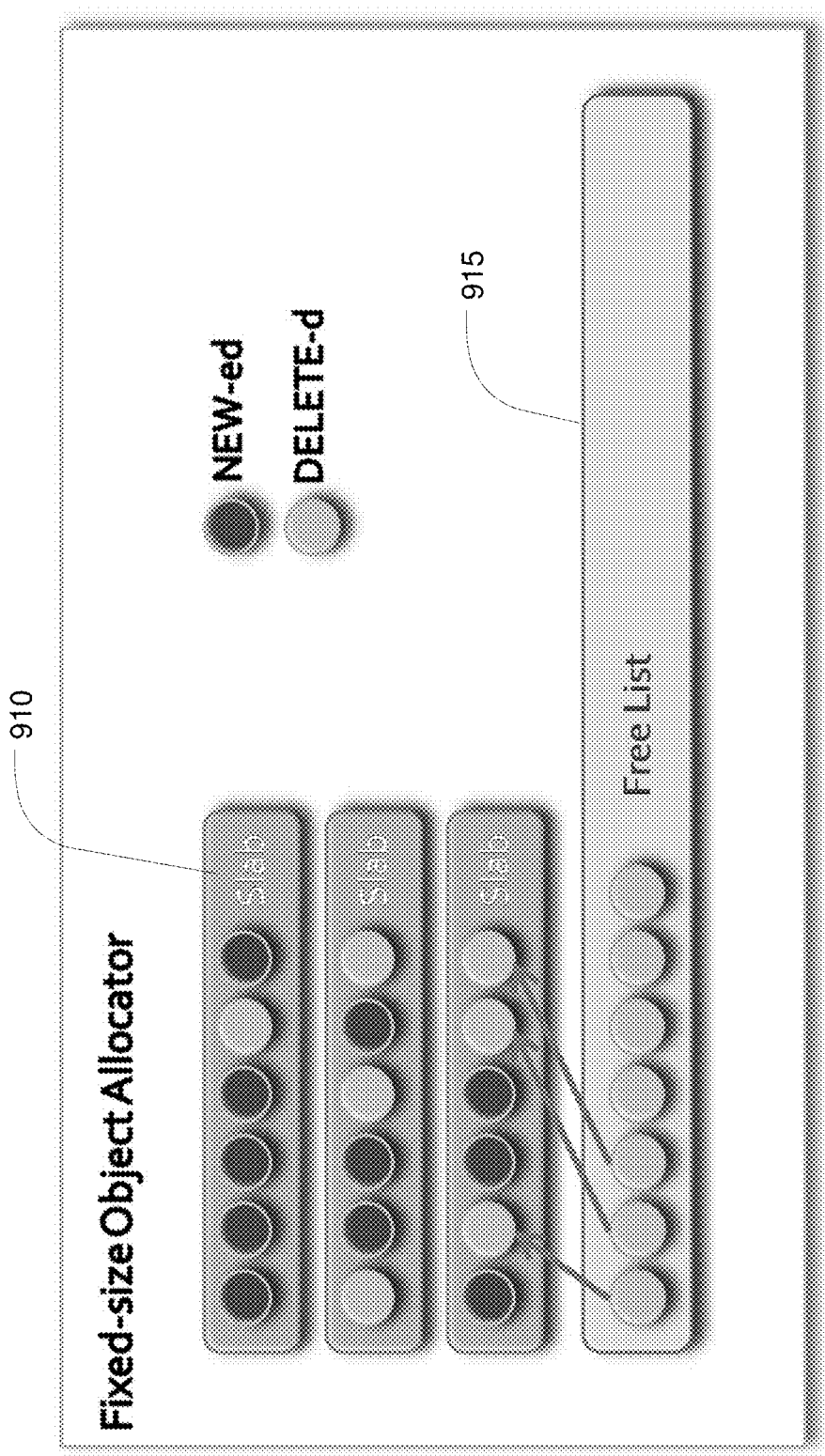
FIG. 9 illustrates the smart memory allocator mechanism for allocation of memory for objects, in accordance with an embodiment of the invention.

The HPHP runtime implements certain memory allocation mechanisms. FIG. 9 illustrates a smart allocator mechanism that allocates one collection (called slab 910) of multiple objects that have the same size at a time. A method is provided to any caller to obtain a new object from the slab. When an object is deallocated, the object is added to a free list 915 maintained by the allocator. The free list 915 is first consulted when a new allocation is requested. The smart allocator converts the overhead of many malloc/free calls to push/pop operations on the free list 915, with much less frequent malloc/free calls for slabs. The tradeoff is that each object consumes extra 64-bit pointer storage in free list.

Figure 10:
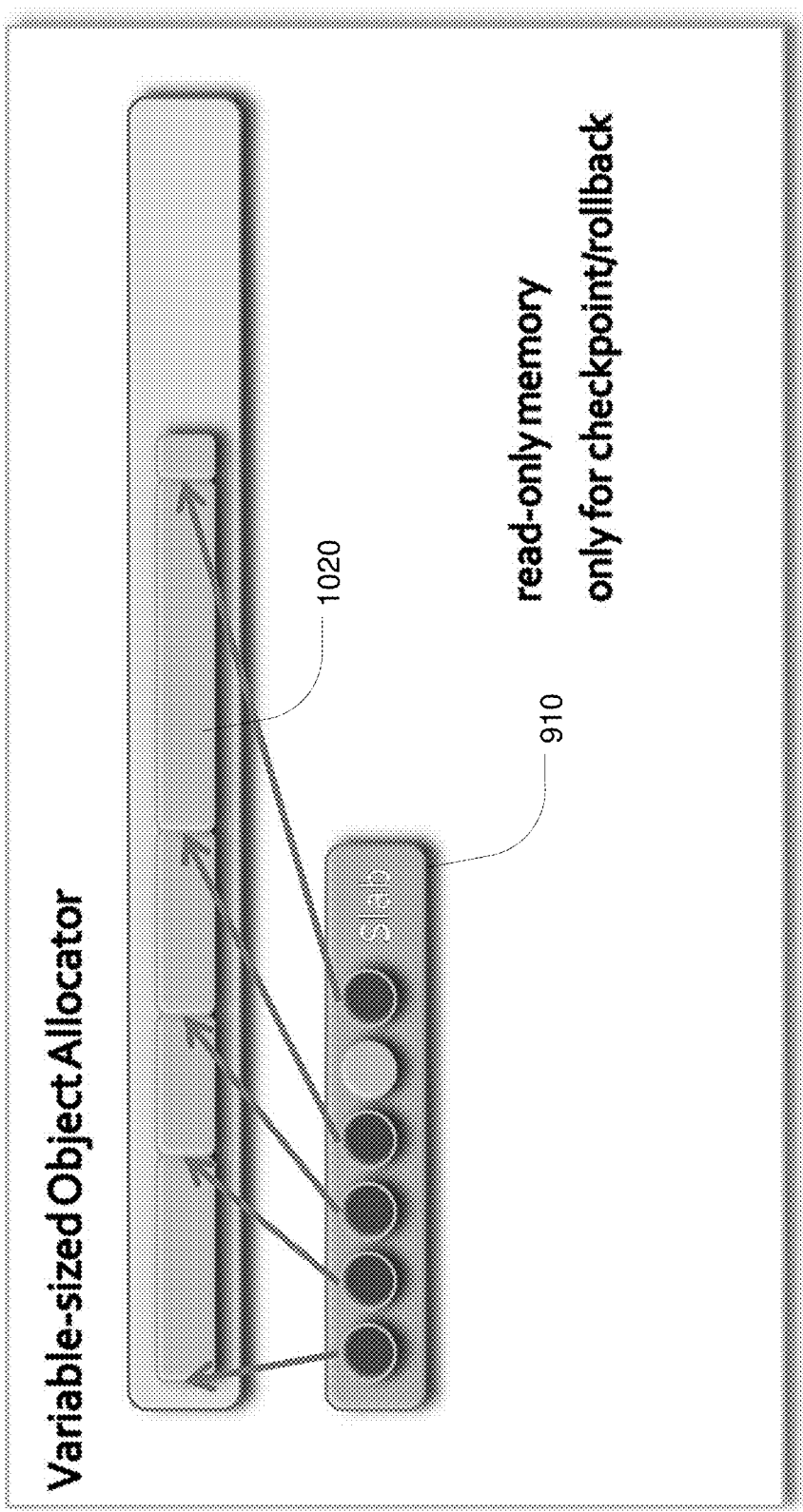
FIG. 10 illustrates the variable size object allocator mechanism, in accordance with an embodiment of the invention.

Another memory allocation mechanism used in HPHP runtime calls is linear allocator, and illustrated in FIG. 10. The linear allocator allocates variable-sized objects 1020 during backup time of doing a memory state checkpoint. The memory state check point saves the memory state on a persistent store, for example, hard disk so that when subsequent requests are received, certain user HPHP code doesn't have to be executed again, if its sole purpose is to initialize global states to certain values.

For example, a String class wraps StringData that's in fixed size. So StringData may use smart allocator for its allocation/deallocation. But StringData may internally keep a char pointer that has a variable size. This string pointer is allocated through general purpose malloc/free initially, but it will be copied into linear allocator, if it is allocated before a check point is taken. When a checkpoint is restored, the HPHP runtime does not make a new copy of the string. Instead the HPHP runtime copies over the string pointer which stays valid, as long as the data in the linear allocator memory is valid. This allows memcpy (single memory copy operation) of entire linear allocator's memory each time a checkpoint is restored, thus making it cheaper than many smaller malloc/free calls.

The following sections describe each of the main modules in further detail.

Parser

Figure 4:
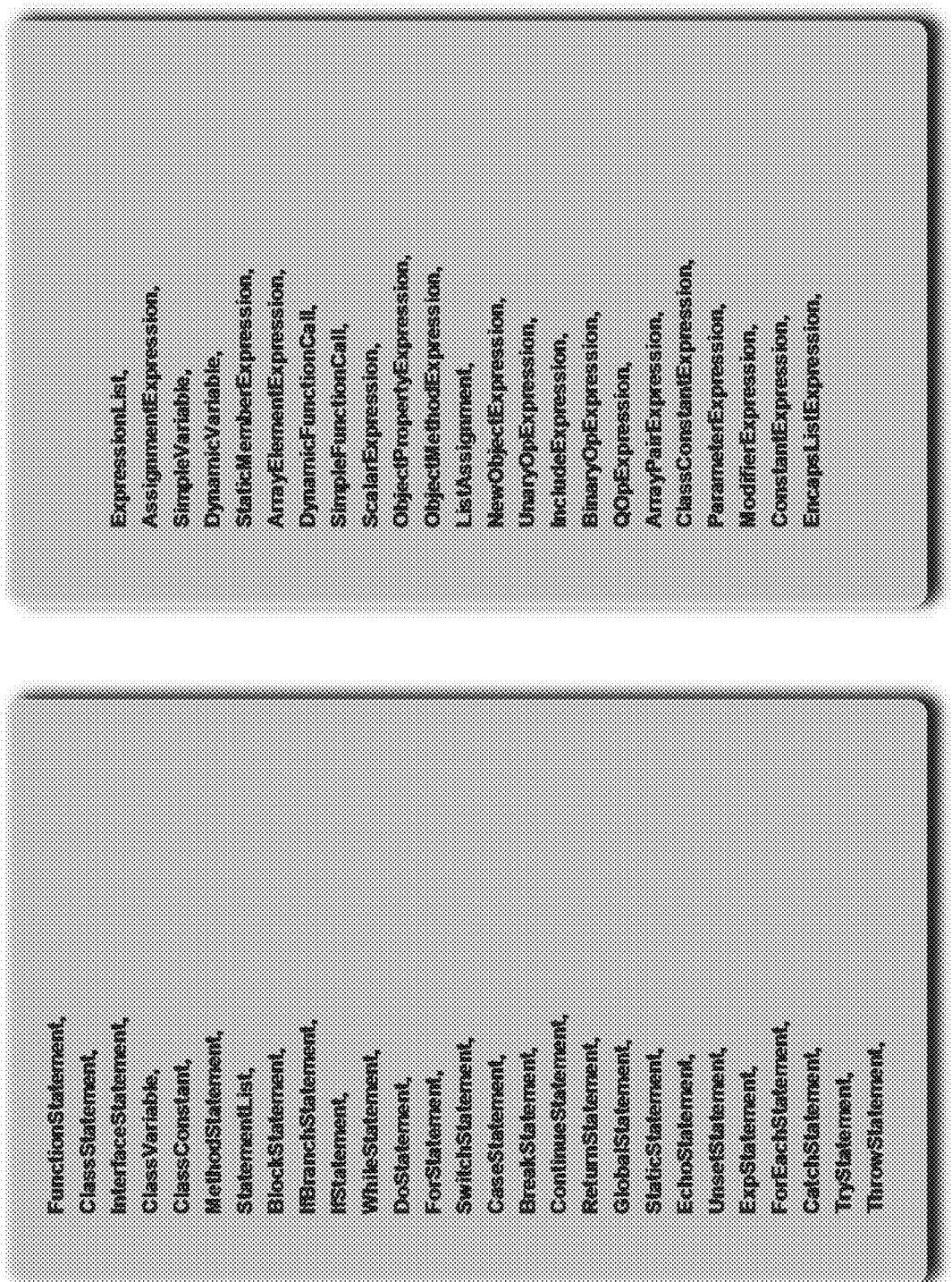
FIG. 4 shows different kinds of statements and expressions supported by the HPHP language, in accordance with an embodiment of the invention.

The parser 125 creates one or more nodes in the AST for each statement and expression of the HPHP source code program. The AST structure is used for traversal of the HPHP source code program by subsequent phases of the HPHP compiler. Each node of the AST corresponds to an instance of a C++ class that represents the statement or expression corresponding to the AST node. For example, nodes of AST are generated for each "class" statement, "method" statement, "if" statement, "for" statement, "do" statement, "switch" statement, "case" statement and other statements. Similarly examples of expressions include assignment expression, function calls, binary expression, unary expression. The AST is called "abstract" since it does not represent each and every syntactic element of the source code. For example, statement separators and program block delimiters may not be represented in the AST. As an example, an "if . . . then . . . " statement may be represented by a single node with two branches, one branch representing the "if" condition and the other branch representing the "then" part of the statement. At this point, the AST represents the basic syntactical structure of the HPHP source code program. FIG. 4 shows different kinds of statements and expressions supported by the HPHP language.

Static Analyzer

Figure 3:
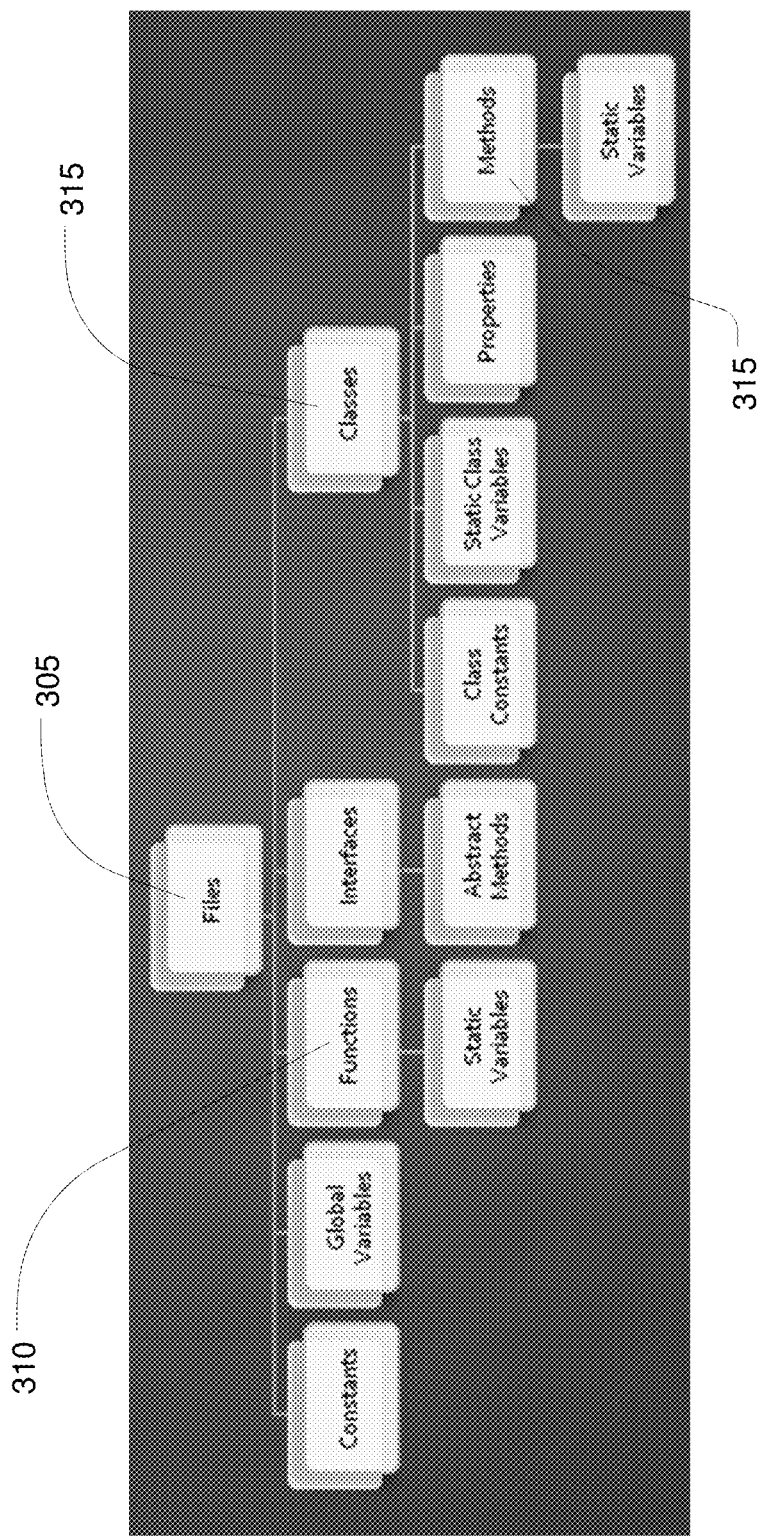
FIG. 3 shows example constructs of the HPHP source code programs represented by the AST and their dependencies, in accordance with an embodiment of the invention.
Figure 5:
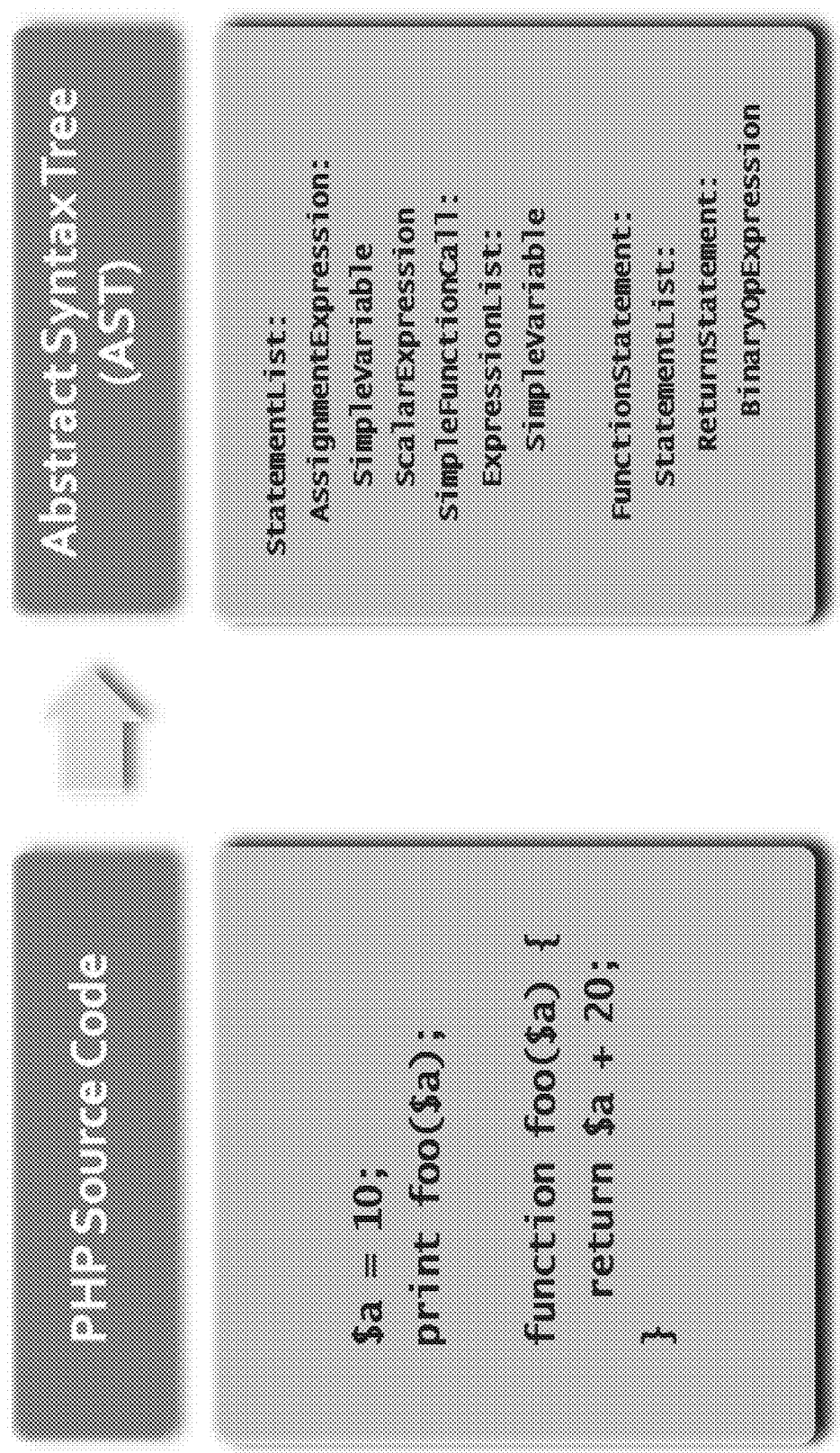
FIG. 5 shows an example of HPHP source code snippet and its conversion to an AST, in accordance with an embodiment of the invention.

The annotated AST generated by the static analyzer 130 represents the various programming constructs, for example, functions and classes of the represented HPHP source code program as well as their dependencies. FIG. 3 illustrates the various constructs of the HPHP source code programs represented by the AST and their dependencies. For example, an AST node corresponding to a file 305 may have dependencies with AST nodes corresponding to functions 310 and classes 315. Similarly, the AST node corresponding to a class 315 may have dependencies with AST nodes representing methods 315. FIG. 5 shows an example of HPHP source code snippet and the corresponding AST. In an embodiment, static analysis includes pre-optimization, type inferencing, and post-optimization stages.

Pre-Optimizer

The pre-optimizer optimizations simplify the AST processed by the type inference engine in order to improve the performance of the type inference phase. The pre-optimizer 135 analyzes each node of the AST and performs transformations of the AST in order to generate a transformed AST. The transformed AST generates more efficient C++ code. Examples of transformations in the pre-optimizer phase include constant inlining, constant folding, short-circuiting of logical operations, converting double quoted strings to cascaded string concatenation operations, dead code elimination, elimination of calls to functions including defined( ) or class exists( ) and the like.

Type Inference Engine

The type system of HPHP compiler and runtime represents primitive types including booleans, integers of 8-bit, 16-bit, 32-bit, or 64-bit, and doubles using C++'s built-in primate type support. For example, HPHP's boolean is represented by C++'s bool type, HPHP's 8-bit integer is represented by C++'s char type, HPHP's 16-bit integer is represented by C++'s short type, HPHP's 32-bit integer is represented by C++'s int type, HPHP's 64 bit integer is represented by C++'s long type, and HPHP's double is represented by C++'s double type.

The String classes in HPHP are implemented using smart pointers. A smart pointer is a structure implemented by the HPHP compiler and runtime that dynamically allocates a data object when needed and de-allocates the object when it is not needed. HPHP arrays are also implemented using smart pointers to the data objects corresponding to the arrays. The use of smart pointers efficiently allows implementation of pass-by-value semantics without making copies of the actual object pointed at. The smart pointer implementation makes a copy of the underlying object when the underlying object is being modified and more than one smart pointers point at the underlying object. A reference count mechanism tracks multiple smart pointers pointing at an underlying object by keeping a reference count value greater than one associated with the underlying object.

The smart pointer mechanism is also used for the user classes in HPHP source code. The user classes in HPHP source code derive from a single class, for example, an ObjectData class. Accordingly, variables referring to objects corresponding to instances of HPHP user classes are represented using smart pointers of different types of ObjectData objects. The objects are passed by reference. The smart pointer mechanism helps ObjectData instances to be deallocated when the associated reference count becomes zero.

A variant class in HPHP language represents a union of multiple other types. The variant class is assigned to a symbol when the type inference mechanism fails to find the exact type of a symbol. The variant class represents a wrapper of a smart pointer and also implements the reference count mechanism. Hence it provides a compact data structure that acts as a type representation that is reference count aware.

The type inference engine 140 operates to infer the types of constants, variables, function/method parameters, return types of functions/methods and expressions. More specifically, each symbol of an HPHP source code program is inferred to a type that is defined in a corresponding C++ program. The type inference engine 140 performs multiple passes of the AST. Each pass propagating the type information based on information inferred from statements. The type inference engine stops making further passes through the AST when no new type information is generated in a pass. Examples of inferred types include Boolean, Byte, Int16, Int32, Int64, Double, String, Array, Object, or Variant.

The following example illustrates how the type inference mechanism of HPHP works. Consider a function foo defined as follows.

```
function foo ($a) {
    $b = $a;
    Print $b;
}
```

Figure 6:
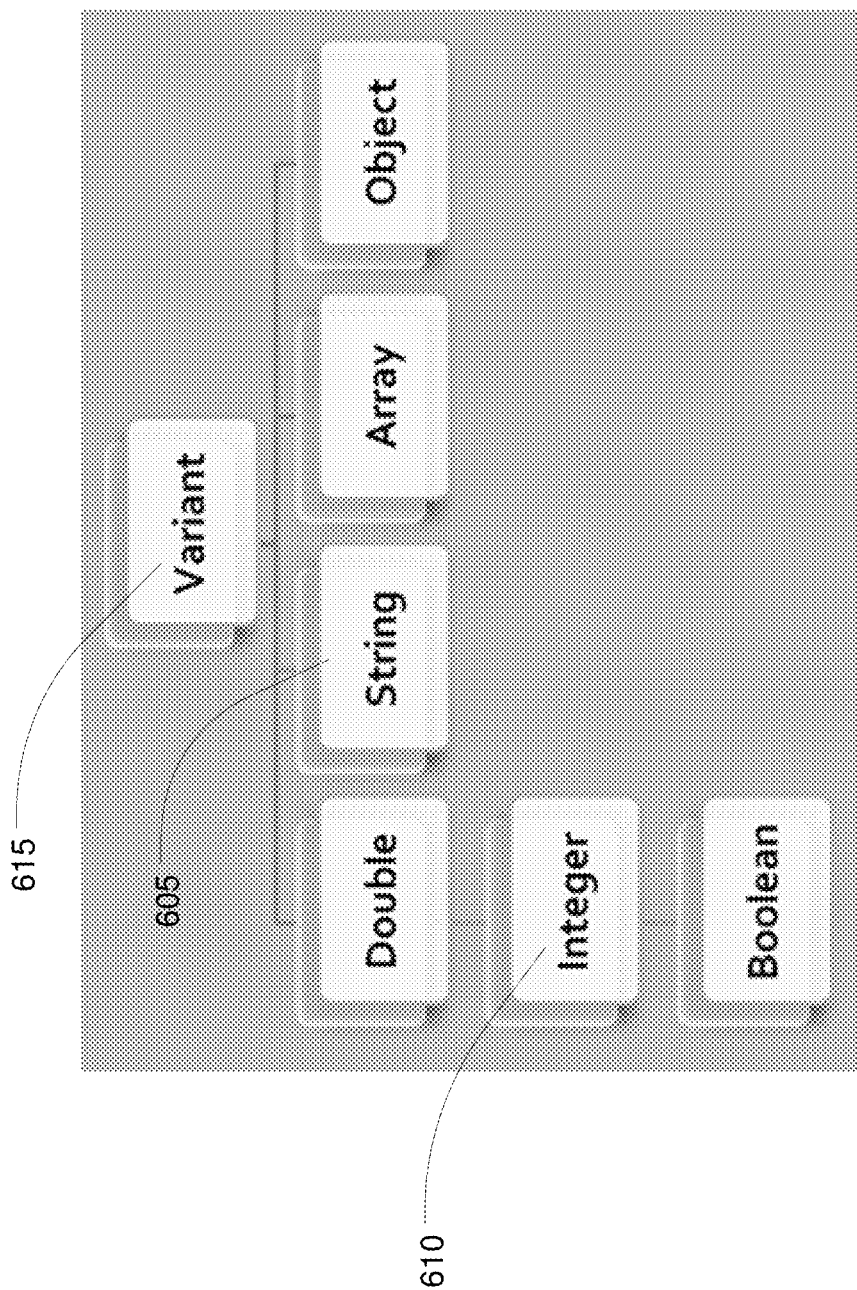
FIG. 6 shows a hierarchy of types inferred by the type inference engine, in accordance with an embodiment of the invention.

Assume that a call to the function foo in the code passes as integer as an input parameter, for example, foo(10). In a first pass through the AST, the type inference engine 140 does not have any specific type information for $b but determines that the type of $a is Integer 610 since an integer can be passed as an argument to function foo( . . . ). In a second pass through the AST, the type inference engine 140 analyzes the statement $b=$a and determine that the value of $a can be assigned to variable $b, and hence the type of $b is also Integer 610. If two separate statements infer two different types for the same variable, the type inference engine 140 resolves the type for the variable as the type corresponding to the least common ancestor of the two types in the hierarchy shown in FIG. 6. For example, assume that the code in the example of the function foo has a call foo(10) as well as a call foo("hello"). As described above, the call foo(10) causes the type inference engine 140 to infer the type of variable $a to be an Integer 610. However, the call foo("hello") causes the type inference engine 140 to infer the type of variable $a to be String 605. Based on the type hierarchy shown in FIG. 6, the type inference engine 140 determines the type of $a to be the least common ancestor of the types Integer 610 and String 605 which is a Variant 615.

FIG. 7 illustrates type inferencing in HPHP using examples of abstractions including function calls, operators and expressions/statements. For example, the call to the function strtolower allows the l-type of $a to be inferred as a String and the r-type of $b to be inferred as a String. The expression 720 based on operator '+' allows $a's l-type to be inferred as a Numeric and $b's r-type to be inferred as a Numeric. The 'for loop' 730 allows $a's r-type to be inferred as an Array and $a's r-type to be inferred as a Variant.

The HPHP compiler passes Boolean, Integer, Double, String and Array objects using pass-by-value mechanism, but Object instances are passed using pass-by-reference mechanism. If the HPHP source code program attempts to pass a String or Array class instance using pass-by-reference mechanism, the corresponding variable is treated as a Variant. If a String or Array variable is passed by reference or the variable is in an r-value context, the type of the variable is inferred by the type inference engine 140 as a Variant type. Accordingly, the code-generation process generates a Variant type variable corresponding to the String or Array variable.

The following code illustrates how two class instances may be affected by changing the value of inner data that is shared by the two class instances.

```
$a = new MyClass( );
$b = $a; // same object
$b->member = 123; // $a also modified
```

The variable $a is first assigned to a new instance of class MyClass. The assignment $b=$a causes both variable $b and $a to point to the new instance of MyClass created. Changing the value of $b→member causes the value of corresponding $a member data to be changed.

The following code fragment illustrates the semantics of weak binding in HPHP.

```
$a = 'some text';
$b = $a; // weak binding
$a = 'other text'; // breaks binding
```

The variable $a is first assigned to a string of text. The assignment $b=$a results both variables are pointing at the same string object and is called a weak binding between $b and $a. The above binding between $b and $a is called weak binding since the two variables can be made to point to two different objects by reassigning any one of the variables to a different object. Assigning $a to a different string value breaks the binding between $b and $a and the two variables point at different objects.

The following code fragment illustrates the semantics of strong binding in HPHP.

```
$a = 'some value';
$b = &$a; // strong binding
$a = 'other value'; // $b is modified
```

The assignment $b=&$a results in a strong binding between $b and $a since both $b and $a are now pointing at the same inner data object. Assigning $a to a different string value modifies the value of the $b variable also.

A Variant class implements pass-by-reference mechanism by encapsulating an inner Variant data object using an inner data pointer. Multiple Variant class instances can share the same Variant data object. A method of the Variant class instance may delegate the corresponding operation to the inner Variant data object. The inner data pointer is associated with a reference counting mechanism that keeps track of the number of instances of the Variant class that are bound to the inner Variant data object. If two instances of Variant class are bound to the same inner Variant data object, any modifications of the inner Variant data object result in the corresponding modification of the associated Variant class instances.

Post-Optimizer

The post optimizer 145 processes each node of the AST to determine if the node can be replaced by another node that generates faster and more efficient code. The post optimizer 145 may replace a set of interconnected nodes by a different set of interconnected nodes thereby changing the graph structure of the AST. The optimizations performed by the port-optimizer 145 include algebraic simplifications, short-circuiting of logical expressions, inlining include expression optimization, removal of assignments with no effect, and string concatenation optimizations.

Code Generator

The code generator 150 generates three groups of files: (1) A header file for each PHP class. The header file is included if the corresponding class is being used by a C++ file. (2) C++ code files from PHP files. One C++ file is generated for each PHP file. The generated C++ file comprises transformed code from the PHP scripts. (3) System files and global tables.

Figure 11:
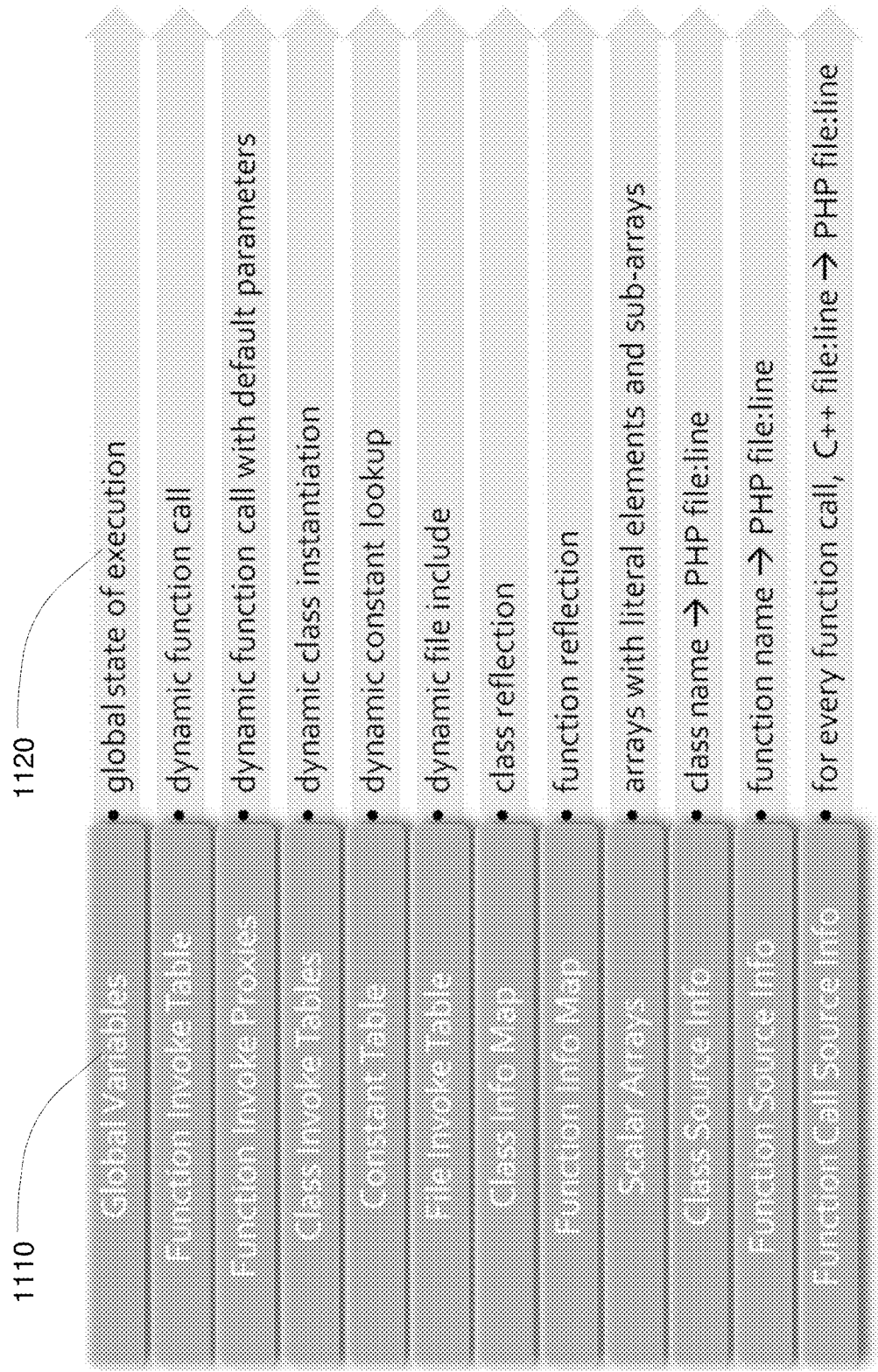
FIG. 11 illustrates the structures in the code generated by the HPHP compiler, in accordance with an embodiment of the invention.

The system files provide the code that facilitates the interaction of the various portions of the generated code. The system file also provides dynamic execution capabilities that may not be possible or very difficult to implement with static code. FIG. 11 shows examples of structures 1110 in the generated code and the corresponding functionality 1120. For example, function invoke table and class invoke table and file invoke table have a jump table or a switch-case statement to locate a function or class or file pointer by name. The GlobalVariables class collects all global variables, function's and class method's static variables, class's static variables, bits to remember whether a file is included, bits to remember whether static variables are initialized, dynamic constants, bits to remember whether a volatile class is declared, function pointers for redeclared functions, class pointers for redeclared classes. The Constant table has a jump table or a switch-case statement to locate a constant's value by name. Other files store static information with their own plain format.

The following example code snippets illustrate usage of HPHP language and generated code from HPHP compiler.

The following example PHP code illustrates how a dynamic function call is made:

```
<?php
$func = 'foo';
$ret = $func($a);
```

The variable function is assigned to a string corresponding to a name of a function. In the above code, the variable $func is assigned to the string 'foo' which is a name of a function.

The following C++ code is generated corresponding to the above PHP dynamic invocation of the function. The C++ function invoke( ) is called. The function invoke( ) takes the name of the function to be invoked as a string argument.

```
// C++
Variant v_ret;
Variant v_a;
String v_func;
v_func = "foo";
v_ret = invoke(v_func, CREATE_VECTOR1(v_a));
```

The following code illustrates how a function invoke table is generated for handling dynamic invocation of functions. The string argument with the name of the function is mapped to a hash value using the hash string( ) function. A switch statement in the generated code maps the hash argument to the appropriate function call.

```
Variant invoke(CStrRef func, CArrRef params) {
    int64 hash = hash_string(func);
    switch (hash) {
    case 1234:
        if (func == "foo") return foo(params[0]);
    cases 1235:
        if (func == "bar") return bar(param[0]);
    ...
    }
    throw FatalError("function not found");
}
```

The following code illustrated redeclaration of a function in PHP. The function foo can return different value based on a condition specified by $condition.

```
<?php
if ($condition) {
    function foo($a) { return $a + 1;}
} else {
    function foo($a) { return $a + 2;}
}
$ret = foo($a);
```

The following C++ code illustrates how the redeclaration of functions is handled in C++ code. C++ functions or class methods are declared for each redeclaration of the function and assigned unique names. The appropriate function is references by using function pointers.

```
if (v_condition) {
    g->i_foo = i_foo$$0;
} else {
```

```
    g->i_foo = i_foo$$1;
}
g->i_foo(v_a);
```

The following example PHP code illustrates static binding of functions. A global string variable foo is accessed in the function and concatenated with a variable $a.

```
<?php
$foo = 'hello';
function foo($a) {
    global $foo;
    $bar = $foo . $a;
    return $bar;
}
```

The corresponding C++ code implementing the static binding of the functions illustrated above. The code constructs a variant object gv_foo that is converted to String and concatenated with the string corresponding to variable a.

```
String f_foo(CStrRef v_a) {
    Variant &gv_foo = g->GV(foo);
    String v_bar;
    v_bar = concat(toString(gv_foo), v_a);
    return v_bar;
}
```

The following PHP code snippet illustrates use of dynamic variables that are used on the fly by a programmer without an explicit declaration of the variable.

```
<?php
function foo( ) {
    $b = 10;
    $a = 'b';
    echo($a);
}
```

The following generated C++ code illustrates the generated C++ code for supporting dynamic variables. The corresponding variables are added to a variable table that stores corresponding variables values. A value of a particular variable is looked by passing the name of the variable as a string to a get(string) method. The get method invokes code that looks up a variable table structure to retrieve a corresponding variable value.

```
void f_foo( ) {
  class VariableTable : public RVariableTable {
  public:
      int64 &v_b; String &v_a;
      VariableTable(int64 &r_b, String &r_a) : v_b(r_b), v_a(r_a) { }
      virtual Variant getImpl(const char *s) {
      // generate hash value using string s
      // use a switch statement based on the hash value
      // in the switch statement return appropriate variable
      value for hash value
      }
  } variableTable(v_b, v_a);
    echo(variableTable.get("b"));
}
```

The above examples illustrate how various features of the scripting language are implemented as C++ code. The ability to compile the scripting language code to C++ code allows generation of object code. The object code is invoked when the corresponding PHP script needs to be evaluated. Several common constructs and code is abstracted into libraries. As a result, the server side script code can be executed much more efficiently than the same code executed using an interpreter.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

What is claimed is:

1. A computer-implemented method comprising:
   receiving a request to compile a markup language document including personal home page (PHP) server side script code, the PHP server side code specifying statements using one or more untyped variables;
   retrieving the markup language document identified in the request;

generating C++ code from the PHP server side script code, the generated C++ code including inferred types for the one or more untyped variables inferred based on variable usage, by:
  mapping an inferred type of an untyped variable to a C++ type;
  defining a variable in the generated C++ code corresponding to the untyped variable, the defined variable having the mapped C++ type; and
compiling the generated C++ code directly to compiled instructions, wherein the compiled instructions are invoked and executed when processing the markup language document.

2. The method of claim 1, wherein the generating C++ code from the server side script code further comprises:
  associating the untyped variable with a first type based on a first usage of the untyped variable in the script code;
  associating the untyped variable with a second type based on a second usage of the untyped variable in the script code; and
  inferring a type of the untyped variable to be an ancestor of both the first type and the second type in a hierarchy of types of variables.

3. The computer-implemented method of claim 2, wherein the type of the untyped variable is inferred to be the least common ancestor of the first type and the second type in the hierarchy of types.

4. The computer-implemented method of claim 1, wherein the generating comprises executing multiple passes through the script code, each pass inferring types of variables based on variable types inferred in a previous pass.

5. The computer-implemented method of claim 1, wherein the untyped variable is a parameter of a function and the first usage comprises an invocation of the function, wherein the type of the untyped variable is inferred to be a type of an argument passed to the function corresponding to the parameter.

6. The computer-implemented method of claim 1, wherein the server side script code is for execution on a server in response to a request for the markup language document.

7. The computer-implemented method of claim 1, wherein the generated C++ code comprises one or more C++ classes, the one or more C++ classes including code corresponding to the server side script code.

8. The computer-implemented method of claim 1, wherein the generating the C++ code from the server side script further comprises:
  parsing the server side script to generate an abstract syntax tree (AST), the AST being a hierarchical tree representation of the server side script;
  storing the inferred type of variables in the AST; and
  generating the C++ code from the AST.

9. The computer-implemented method of claim 1, wherein the compiling the C++ code further comprises:
  creating shared alternative cache variables for the multi-process object code, the shared alternative cache variables shared amongst the multiple processes of the object code when the object code is invoked; and
  compiling the C++ code as multi-process object code.

10. The computer-implemented method of claim 1, wherein the compiling the C++ code further comprises:
  generating C++ code for a push/pop free list, the free list capable of storing indicators of objects allocated into memory; and
  generating C++ code for a linear allocator, the linear allocator capable of storing variables through a checkpoint.

11. The computer-implemented method of claim 1, wherein the generating the C++ code further comprises:
  generating a function invoke table for handling dynamic invocation of functions in the server side script code.

12. The computer-implemented method of claim 1, wherein the generating the C++ code further comprises:
  generating a variable table to store variable values for dynamic variables that are implicitly declared in the server side script code.

13. A non-transitory computer readable medium comprising instructions, that when executed by a processor, cause the processor to:
  receive a request to compile a markup language document including personal home page (PHP) server side script code, the PHP server side code specifying statements using one or more untyped variables;
  retrieve the markup language document identified in the request;
  generate C++ code from the PHP server side script code, the generated C++ code including inferred types for the one or more untyped variables inferred based on variable usage, by:
    mapping an inferred type of an untyped variable to a C++ type;
    defining a variable in the generated C++ code corresponding to the untyped variable, the defined variable having the mapped C++ type; and
  compile the generated C++ code directly to compiled instructions, wherein the compiled instructions are invoked and executed when processing the markup language document.

14. The non-transitory computer readable medium of claim 13, wherein the non-transitory computer readable medium comprises further instructions for the generation of the C++ code from the server side script, that when executed by the processor, cause the processor to:
  parse the server side script to generate an abstract syntax tree (AST), the AST being a hierarchical tree representation of the server side script;
  store the inferred type of variables in the AST; and
  generate the C++ code from the AST.

15. The non-transitory computer readable medium of claim 13, wherein the non-transitory computer readable medium comprises further instructions for the generation of the C++ code from the server side script, that when executed by the processor, cause the processor to:
  create shared alternative cache variables for the multi-process object code, the shared alternative cache variables shared amongst the multiple processes of the object code when the object code is invoked; and
  compile the C++ code as multi-process object code.

16. The non-transitory computer readable medium of claim 13, wherein the non-transitory computer readable medium comprises further instructions for the generation of the C++ code from the server side script, that when executed by the processor, cause the processor to:
  generate C++ code for a push/pop free list, the free list capable of storing indicators of objects allocated into memory; and
  generate C++ code for a linear allocator, the linear allocator capable of storing variables through a checkpoint.

17. The non-transitory computer readable medium of claim 13, wherein the non-transitory computer readable medium comprises further instructions for the generation of the C++ code from the server side script, that when executed by the processor, cause the processor to:

generate a function invoke table for handling dynamic invocation of functions in the server side script code.

18. The non-transitory computer readable medium of claim 13, wherein the non-transitory computer readable medium comprises further instructions for the generation of the C++ code from the server side script, that when executed by the processor, cause the processor to:

generate a variable table to store variable values for dynamic variables that are implicitly declared in the server side script code.

* * * * *